Sept. 9, 1941.   M. B. KANTER   2,255,319
PHOTOGRAPHIC ENLARGER
Filed Aug. 12, 1939   2 Sheets-Sheet 2
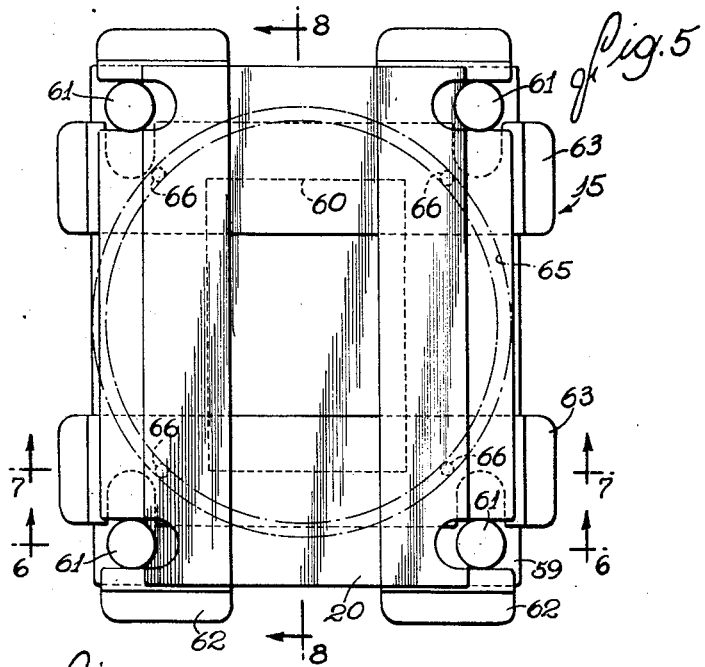
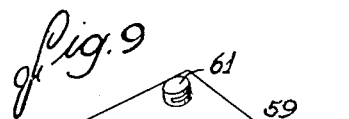
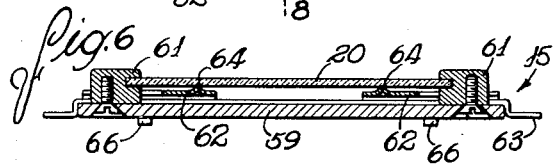
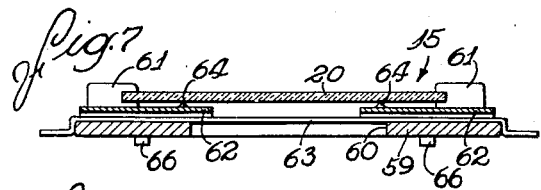
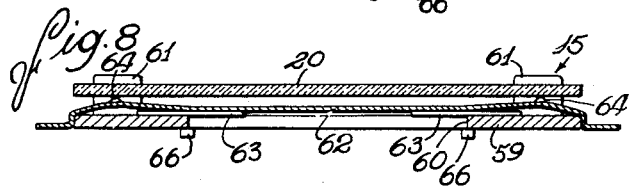
INVENTOR
Milton B Kanter
By Parker, Carlson, Pitzner & Hubbard
ATTORNEYS Patented Sept. 9, 1941

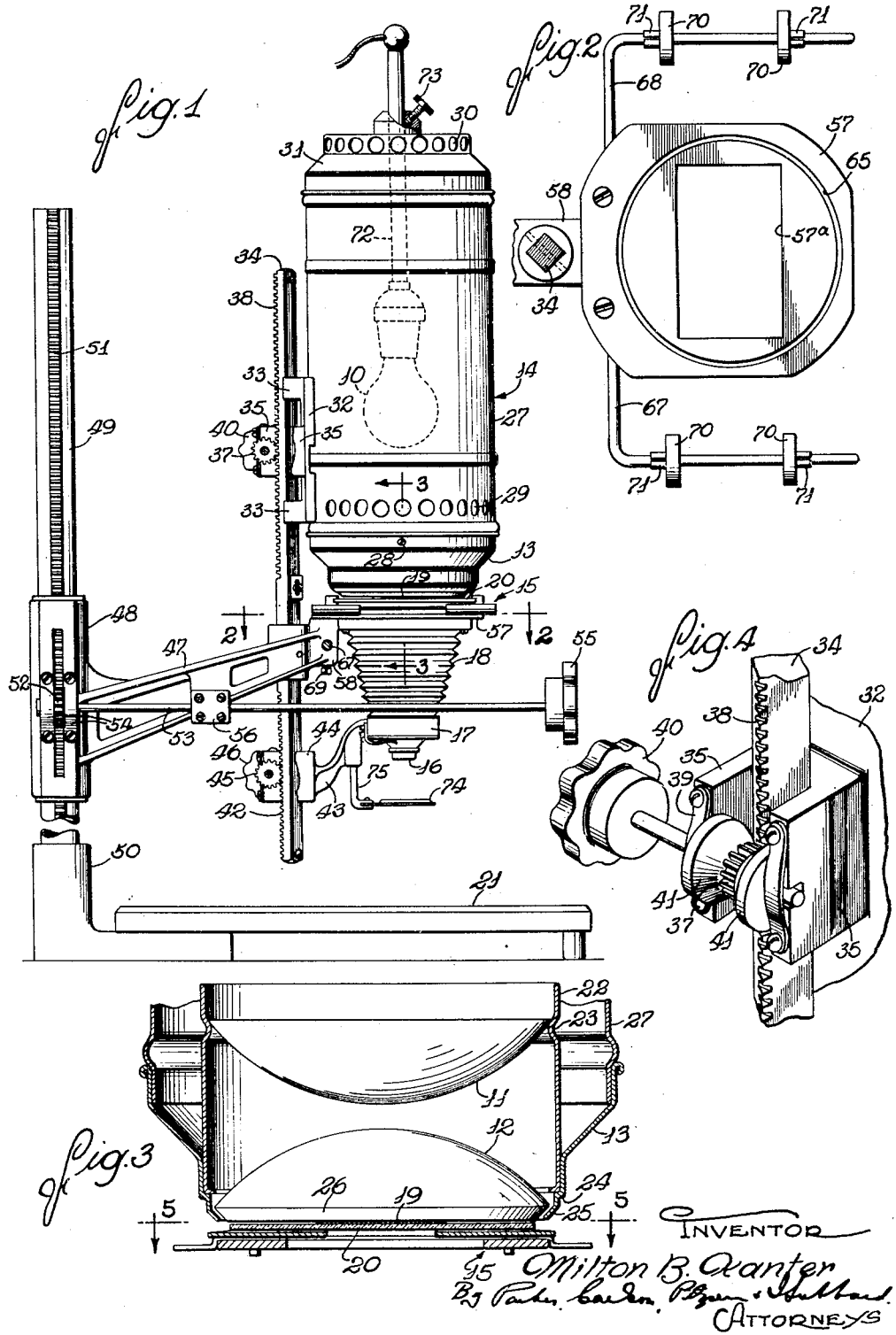

2,255,319

UNITED STATES PATENT OFFICE 2,255,319

PHOTOGRAPHIC ENLARGER

Milton B. Kanter, Chicago, Ill.

Application August 12, 1939, Serial No. 289,755

8 Claims. (Cl. 88—24)

The present invention relates to improvements in photographic enlargers.

One general object of the invention is to provide an improved enlarger of such character as to simplify the task of inserting and removing negatives or films during the use of the device, as well as to simplify the process of masking off or "cropping" of desired portions of the negative.

A more specific object is to provide an enlarger embodying a relatively movable lamp housing assembly and negative carrier between which a film may be sandwiched and clamped in position simply by the pressure of the opposed portions of the assembly and carrier when they are moved together but of such character, however, that even when the negative is clamped it may be freely rotated about an axis parallelling the light path through it in order to change the angular position of the projected image.

Another and important object of the invention is to provide in a device of the character indicated a novel masking assembly adapted to carry a negative which is to be enlarged and by means of which the negative can be masked any desired amount and adjusted in angular position, all by means of very simple manipulative operations.

The invention also resides in various structural improvements in the device by virtue of which low cost of manufacture is combined with ease of manipulation and operation as well as ruggedness of construction.

Further objects and advantages of the invention will become apparent as the following description proceeds, taken in connection with the accompanying drawings in which:

Figure 1 is a side elevation, partly in section, of a photographic enlarger embodying the invention.

Fig. 2 is an enlarged fragmentary transverse sectional view along the line 2—2 in Fig. 1.

Fig. 3 is an enlarged fragmentary sectional view along the line 3—3 in Fig. 1.

Fig. 4 is an enlarged detail perspective view of the lamp housing elevating mechanism.

Fig. 5 is an enlarged plan view of the cropping mask assembly.

Figs. 6, 7 and 8 are vertical sectional views taken respectively along the lines 6—6, 7—7, and 8—8 in Fig. 5.

Fig. 9 is a detail perspective view of a mask included in the assembly of Fig. 5.

For purposes of exemplification the invention has been shown and described herein as embodied in an enlarger (Fig. 1) which is especially adapted for use by amateur photographers. It will be apparent to those skilled in the art, however, that the invention is applicable to a large variety of specific forms of enlargers. Accordingly, even though one particular embodiment of the invention has been shown and described in some detail, there is no intention to thereby limit the invention to such embodiment, but on the other hand the appended claims are intended to cover all modifications and alternative constructions falling within the spirit and scope of the invention.

In the illustrative enlarger (Fig. 1) the optical system of the instrument includes an electric lamp 10 as a source of light, the usual condensing lenses 11 and 12 (Fig. 3) arranged in a casing section or extension 13 at the lower end of the lamp housing 14 (Fig. 1), and an enlarging camera including a cropping mask assembly designated generally by the numeral 15 and the usual enlarging lens 16 carried on a lens mount 17 at the lower end of an extensible bellows 18. Light emitted from the lamp 10 is applied by the condensing lenses 11, 12 to a negative 19 sandwiched between the lamp housing assembly and a glass negative carrier plate or platform 20 which forms the top of the cropping mask assembly 15 (see also Fig. 3). The image on the negative 19 is thus projected in enlarged form, by the lens 16, on a piece of sensitized paper (not shown) carried by a rectangular flat baseboard 21. The mode of operation of this general type of optical system is familiar to those skilled in the art and, consequently, further description in that regard is believed to be unnecessary.

Ease and simplicity of inserting and removing the negatives characterize the present enlarger. To insert the negative 19 in the instrument, the lamp housing 14 is raised to expose the top of the carrier 20 and the negative is laid on this carrier. The lamp housing is then lowered so that the bottom condensing lens 12, which is floatingly mounted in a manner hereinafter described, rests on the negative and presses it flat against the carrier 20. Thereafter the angular position of the negative and the portion of it to be exposed can be easily adjusted by means of the cropping mask assembly 15, as is also hereinafter explained.

The upper condensing lens 11 is carried in a cylindrical sheet metal holder 22 (Fig. 3), being arranged to rest on an annular bead 23 formed in the side wall of the holder. The inwardly curled lower edge of this holder 22 in turn rests on a shoulder 24 fashioned in the side wall of the casing section 13. The lower edge of the casing section 13 is inturned as indicated at 25 at an angle complemental to a bevel 26 on the lower condensing lens 12 so that this lens is freely or floatingly mounted in the bottom of the casing 13. Consequently, when the lamp housing assembly 14 is lowered the bottom condensing lens 12 finally comes to rest on the negative 19 and the weight of this large condensing lens holds the negative securely in place. It will be noted that the casing section 13 is telescoped over the lower end of a tubular outer wall or casing 27 of the lamp housing proper, in which position it is removably held by screws 28 (Fig. 1). It will thus be seen that to remove the condensing lenses 11 and 12 the casing 13 is first taken off and the carrier 22 lifted out of it, whereupon the two lenses may be removed respectively from the holder 22 and casing 13.

Raising and lowering of the lamp housing 14 for clamping and unclamping of negative 19 is accomplished by means of a rack and pinion mounting for the lamp housing. The housing 14 itself is of the usual double-walled air-cooled sheet metal construction being generally cylindrical in shape. Cooling air enters the space between the inner and outer housing walls through holes 29 (Fig. 1) in the outer casing 27, circulates upward by convection and is discharged through holes 30 in a sheet metal cover 31 telescoped over the top of the casing 27. On the side of the casing 27 is fixed a bracket 32 having notched guide projections 33 which embrace a corner of a stationary vertical rod 34, the latter being square in cross section. The arms of a U-shaped projection 35 on the bracket 32 extend on each side of the rod 34, and in notches 36 (Fig. 4) in the outer ends of these arms is journaled a pinion 37 meshing with rack teeth 38 fashioned on the rear edge of the rod 34. The shaft carrying the pinion 37 is held in the notches 36 by spring pressure straps 39 screwed to the outer ends of the arms 35. These pressure straps or bands also serve to urge the pinion 37 inward into firm frictional engagement with the rack teeth 38 so as to prevent inadvertent gravitational descent of the lamp housing 14. To move the lamp housing up and down the operator need only turn a knob 40 on the projecting end of the shaft to which the pinion 37 is fixed. As a further aid in guiding the pinion along the rack two opposed guides 41 of truncated cone shape are fixed to the opposite ends of the pinion 37 and engage the opposed side surfaces of the rod or bar 34.

For the sake of simplicity in construction a second series of rack teeth 42 (Fig. 1), also fashioned on the rod 34, is utilized as part of a rack and pinion adjustment mechanism for focusing the instrument. For this purpose the lens mount 17 on the lower end of the bellows 18 is fixed to a bracket 43 having a U-shaped end 44 slidably engaged with the rod 34. Between the arms of this U-shaped extension 34 is journaled a pinion 45 in the same manner as the pinion 37 described above and meshing with the rack teeth 42. A second hand wheel or knob 46 connected to the pinion 45 is used by the operator in turning the pinion 45 to move the lens 16 up or down as may be required in focusing.

To accomplish larger changes in displacement of the lens 16 from the baseboard 21 for focusing, provision is made for shifting vertically the rod 34 and both the lamp housing and enlarging camera carried by it. Thus the rod 34 is fixed to a bracket 47 which extends from a sleeve 48 that is slidable vertically on a post 49. This post is angularly adjustable in a base socket 50 to which the baseboard 21 is also fixed. A rack 51 is fixed to the side of the post 49 and a pinion 52, carried by shaft 53 journaled on a sleeve 48, meshes with this rack. The pinion 52 is urged into engagement with the rack 51 by spring pressure straps 54 just as in the case of the pinion 37 previously described.

To raise and lower the sleeve 48, and accordingly all of the parts carried on the rod 34, the operator need only rotate the pinion shaft 53. To facilitate this adjustment the shaft 53 is extended to the front of the machine and a hand knob 55 provided on its forward end. The intermediate portion of this shaft is journaled on the bracket 47 at 56.

Of particular importance in the enlarger is the novel cropping mask assembly 15, heretofore generally noted. This assembly is preferably removable as a unit from the rest of the apparatus for the sake of simplicity in cleaning and inspection. In brief, it includes on its top surface a negative carrier, shown as the glass plate 20, together with means below this plate forming an aperture of adjustable size. By adjusting the size of the aperture beneath the negative 19, the aperture can be made to fit exactly a film of any desired size up to the full dimensions of the aperture and alternatively desired portions of a negative can be masked off or "cropped." The assembly 15 is arranged for swiveling motion about a vertical axis so as to adjust the angular position of the negative relative to the sensitized paper on which it is projected. Both the aperture size adjustment and angular adjustment can be readily carried out with the negative in place so that the appearance of the projected image can be observed while the adjustments are being made.

In the instant embodiment the assembly 15 has been shown as mounted on a horizontal metal plate 57 (Figs. 1 and 2) fixed on an extension 58 in the outer end of the bracket 47. A rectangular aperture 57a in the plate 57 is of the dimensions of the maximum size of film area that can be enlarged in the device. To the lower side of this plate 57 is fixed the bellows 18 by a suitable light-tight connection.

The mask assembly itself comprises a sheet metal bottom plate or mask 59 (Fig. 9) having a central aperture 60 of the same dimensions as the aperture 57a in the supporting plate 57 (see Fig. 2). Four corner studs 61 screwed to the mask 59 (Fig. 6) are slotted to receive the glass cover plate or negative carrier 20 of the mask assembly. This glass cover plate can be slid longitudinally out of the supporting slots for cleaning and the like. The cover plate 20 and bottom plate 59 are thus mounted in closely spaced parallel relation with room between them for means to vary the effective area of the aperture 60 as described below.

In order to vary the effective area of the aperture in the mask assembly 15 two pairs of adjustable blades 62 and 63 are slidably mounted between the opposed faces of the top and bottom plates 20 and 59. These blades are opaque, being preferably fashioned as stampings from sheet metal such as spring steel. The respective pairs of blades are arranged at right angles to each other with the blades in each pair having their edges opposed and generally parallel. The end portions of each of the blades is bent down in offset relation so as to engage the adjacent edge of the mask or bottom plate 59 to guide the blades for movement across the base of the mask. The projecting ends of the blades form convenient finger grips for manipulating them, that is, sliding them back and forth across the aperture 60. The edge portions of the blades adjacent the studs 61 are notched (Fig. 5) to facilitate displacement of the blades a sufficient distance away from the center of the mask 59 to entirely clear aperture 60 when the blades are completely retracted. Bosses 64 struck up from the upper sides of the blades 62 and 63 are urged into engagement with the under surface of the glass cover plate 20 by the resiliency of the sheet metal blades so as to hold the blades frictionally in adjusted position.

It will be apparent that with the arrangement described the two pairs of blades 62 and 63 can be adjusted toward and away from each other in order to cover any desired portions of the aperture 60 in the main mask 59 and to leave an effective aperture of a size matching any desired size of film up to the maximum area of the aperture 60. Furthermore, the blades can be untilized to mask off or crop any desired portion of the negative or film resting on the cover plate 20 above the aperture 60.

To make possible angular adjustment of the mask assembly 15 a circular groove 65 (Figs. 2 and 5) is fashioned in the upper surface of the supporting plate 57 with its center at the center of the aperture in the supporting plate. Four small studs 66 on the bottom of the mask 59 are arranged to ride in this groove. Accordingly, the mask assembly 15 can be swiveled about its center into any selected angular position. In the event that a negative 19 is clamped on the negative carrier 20 by the lower condensing lens 12 the negative will, of course, turn with the mask assembly during adjustment of the latter's angular position since the bottom condensing lens 12 is floatingly mounted and free to turn within the casing 13.

In some instances the operator may wish to enlarge selected negatives on a reel of film rather than a separate single negative. To facilitate handling of such a reel of film, two reel carriers 67 and 68 (Fig. 2) are provided. These carriers comprise L-shaped rods with their butt ends swiveled in holes in the bracket extension 58, being held in position by set screws 69 (Fig. 1.) When not in use the screws 69 are loosened and the carriers swung down out of the way. Collars 70, slidable on the carrier rods 67—68, and held frictionally in place by split sleeves 71, form stops for the reels (not shown) which are journaled on the carriers.

In the operation of the enlarger described, the operator turns the knob 55 to raise the bracket 47 and parts carried by it to approximately the necessary height for the size of enlargement selected. The lamp housing can be adjusted for maximum illumination by sliding its supporting rod 72 vertically after loosening the dog screw 73. To insert a negative 13 the operator simply turns the knob 40 to elevate the lamp housing, lays the negative on the carrier 20 and then relowers the lamp housing until the lower condensing lens 12 rests on the negative. The negative is thus quickly and firmly clamped between two smooth glass surfaces, which are automatically alined in view of the floating mounting of the lens 12, so that there is no danger of scratching or damaging the negative.

Having inserted the negative 19 the operator focuses the enlarger by turning the knob 46 to raise or lower the lens 16. When focusing on a sensitized paper a red filter 74 (Fig. 1), swiveled in a bracket arm 75, is swung into place to intercept the light beam. After properly focusing the instrument the operator grasps the ends of the masking blades 62, 63 (Fig. 5) and either adjusts them to border the particular size of negative being used or to mask off part of it, just as may be desired. For a change in angular position of the negative the operator has only to swivel the masking assembly 15 about its vertical axis as previously described and without unclamping or removing the negative. All of these manipulations can be carried out so simply and conveniently that the user can devote his full attention to the artistry of his work rather than being distracted with a multiplicity of mechanical details.

I claim as my invention:

1. In a photographic enlarger the combination of a horizontal negative carrier plate and an underlying apertured mask secured to it in a unitary assembly, means including a floatingly mounted condensing lens arranged above said plate for holding a negative in position on the upper surface of said plate, and means supporting said unitary assembly for swiveling motion about a vertical axis, said floatingly mounted condensing lens serving to hold a negative in place on said carrier plate during the swiveling motion of the latter.

2. In a photographic enlarger the combination of an apertured horizontal supporting member, a horizontal negative carrier plate and an underlying apertured mask secured to it in a unitary assembly, said unitary assembly being carried on said supporting member, a vertically movable lamp housing arranged above said assembly and having a floatingly mounted condensing lens in the lower end thereof, means supporting said lamp housing for vertical movement toward and away from said carrier plate to bring said condensing lens into and out of clamping engagement with a negative placed on the upper surface of said carrier plate, an enlarging camera bellows fixed to the lower side of said supporting member, and means supporting said unitary assembly on the upper side of said supporting member for swiveling motion about a vertical axis.

3. In a photographic enlarger, the combination of a horizontal negative carrier plate and an underlying apertured mask secured to it in a unitary assembly, means for holding a negative in position on the upper surface of said carrier plate, a supporting member arranged beneath said unitary assembly and having a circular groove in its upper surface, and studs fixed on the lower side of said mask and arranged to ride in said groove to support said unitary assembly for angular adjustment about a vertical axis.

4. In an apparatus of the type described the combination of a horizontal transparent-glass negative-carrier plate, a condensing lens above said plate, means floatingly supporting said lens in position to press a negative against said plate with the negative sandwiched between the smooth glass surfaces of said lens and plate, and adjustable means beneath said plate and separated by the latter from the negative for masking off selected portions of the negative.

5. In an apparatus of the type described a cropping mask assembly comprising a mask fashioned of opaque sheet materail and having a rectangular central opening therein, a transparent negative carrier plate fixed in closely spaced relation to one surface of said mask, two pairs of cooperating resilient sheet metal blades interposed between said plate and mask and arranged with the blades in one pair at right angles to those of the other pair, the blades in each pair being slidable toward and away from each other to mask off a desired portion of the aperture in said mask, said blades having abutments thereon urged into frictional engagement with said plate by the resilience of the blades to hold them in position, and the blades having projecting ends adapted to be gripped by the user in adjusting their position.

6. In an apparatus of the type described a cropping mask assembly comprising a mask fashioned of opaque sheet material and having a rectangular central opening therein, studs projecting from the surface of said mask and presenting opposed slots, a glass negative-carrier plate removably mounted in said slots in closely spaced relation to said mask, and a plurality of thin opaque blades slidably arranged between the opposed faces of the mask and plate for masking off various portions of said aperture.

7. In a photographic enlarger, the combination of two main elements comprising a lamp housing and an enlarging camera respectively and having light-passage apertures in opposed generally flat end faces thereof, means supporting said elements for adjusting movement of said faces toward and away from each other and restraining said elements against swiveling motion about an axis substantially paralleling the light path through said light-passage apertures, a substantially flat negative carrier assembly removably sandwiched between said opposed faces, the latter being movable toward and away from each other on said supporting means for insertion and removal of the carrier, means including interfitting parts on said carrier assembly and at least one of said elements for releasably retaining said assembly against lateral displacement while guiding it for swiveling adjustment motion about said axis, and means on the exterior of said assembly and manipulable while the assembly is sandwiched between said elements for swiveling said assembly about said axis without disturbing said elements.

8. In a photographic enlarger, the combination of a negative carrier assembly of generally thin, flat configuration, means for clamping a negative across one face of said assembly, a support presenting a face generally complemental to the other face of said assembly, means including a generally circular groove in one of said complemental faces and studs on the other projecting into such groove forming a readily disconnectible connection between the support and assembly for guiding the latter for swiveling adjustment about an axis of rotation substantially normal to the carrier.

MILTON B. KANTER.